United States Patent
Wells et al.

(10) Patent No.: US 11,914,898 B2
(45) Date of Patent: Feb. 27, 2024

(54) SYSTEMS, METHODS, AND NON-TRANSITORY COMPUTER-READABLE MEDIA FOR THIN PROVISIONING IN NON-VOLATILE MEMORY STORAGE DEVICES

(71) Applicant: Kioxia Corporation, Tokyo (JP)

(72) Inventors: Steven Wells, San Jose, CA (US); Neil Buxton, Oxfordshire (GB)

(73) Assignee: KIOXIA CORPORATION, Tokyo (JP)

( * ) Notice: Subject to any disclaimer, the term of this patent is extended or adjusted under 35 U.S.C. 154(b) by 28 days.

(21) Appl. No.: 17/584,695

(22) Filed: Jan. 26, 2022

(65) Prior Publication Data

US 2023/0236763 A1 Jul. 27, 2023

(51) Int. Cl.
*G06F 12/00* (2006.01)
*G06F 3/06* (2006.01)

(52) U.S. Cl.
CPC ............ *G06F 3/0659* (2013.01); *G06F 3/061* (2013.01); *G06F 3/0604* (2013.01); *G06F 3/064* (2013.01); *G06F 3/0644* (2013.01); *G06F 3/0673* (2013.01); *G06F 3/0679* (2013.01)

(58) Field of Classification Search
CPC ...... G06F 3/0659; G06F 3/0604; G06F 3/061; G06F 3/064; G06F 3/0644; G06F 3/0673; G06F 3/0679
See application file for complete search history.

(56) References Cited

U.S. PATENT DOCUMENTS

| | | | |
|---|---|---|---|
| 10,241,859 B2 * | 3/2019 | Kanno | H03M 13/05 |
| 2018/0121344 A1 | 5/2018 | Seo et al. | |
| 2019/0042098 A1 * | 2/2019 | Li | G06F 3/068 |
| 2021/0326319 A1 | 10/2021 | Jernigan et al. | |
| 2022/0011953 A1 | 1/2022 | Lian et al. | |

FOREIGN PATENT DOCUMENTS

| | | |
|---|---|---|
| CN | 109002258 A | 12/2018 |
| CN | 111800450 A | 10/2020 |
| TW | 201824033 A | 7/2018 |
| TW | 202203033 A | 1/2022 |

* cited by examiner

*Primary Examiner* — John A Lane
(74) *Attorney, Agent, or Firm* — Foley & Lardner LLP

(57) ABSTRACT

Various implementations described herein relate to creating a namespace in response to determining that a sum of namespace sizes of a plurality of namespaces is less than a first threshold for the point of thin-provisioning. A write command and data are received from a host. The write command and the data are received in response to determining that a sum of namespace utilization of the plurality of namespaces is less than a second threshold. The data is compressed and stored in the created namespace.

20 Claims, 4 Drawing Sheets

SYSTEMS, METHODS, AND NON-TRANSITORY COMPUTER-READABLE MEDIA FOR THIN PROVISIONING IN NON-VOLATILE MEMORY STORAGE DEVICES

TECHNICAL FIELD

The present disclosure relates generally to non-volatile memory devices, and in particular, to thin provisioning and data compression of non-volatile storage devices.

BACKGROUND

Users or hosts typically store less data in data storage devices, including non-volatile storage devices such as Solid State Drives (e.g., SSDs) than what the users indicate as required. Thin provisioning allows storage devices to allocate and provision storage space for users based on the amount of data that the users actually store or are expected to store, such that the actual allocated storage spaces for each user may be less than what each user has indicated. In other words, when thin provisioning is implemented, the aggregate space indicated as needed by the users is greater than the total space on the storage device for storing user data.

However, current thin-provisioning approaches do not realize adequate cost-efficiency for data storage devices, especially in datacenter settings, due to modern data usage demands by users. Accordingly, there is a long felt need for SSDs to expand advertised storage capacity while seamlessly provide sufficient physical storage in a manner that lowers the Total Cost of Ownership (TCO)

SUMMARY

In some arrangements, a namespace is created in response to determining that a sum of namespace sizes of a plurality of namespaces is less than a first threshold for the point of thin-provisioning. A write command and data are received from a host. The write command and the data are received in response to determining that a sum of namespace utilization of the plurality of namespaces is less than a second threshold. The data is compressed and stored in the created namespace

DETAILED DESCRIPTION

Figure 1:
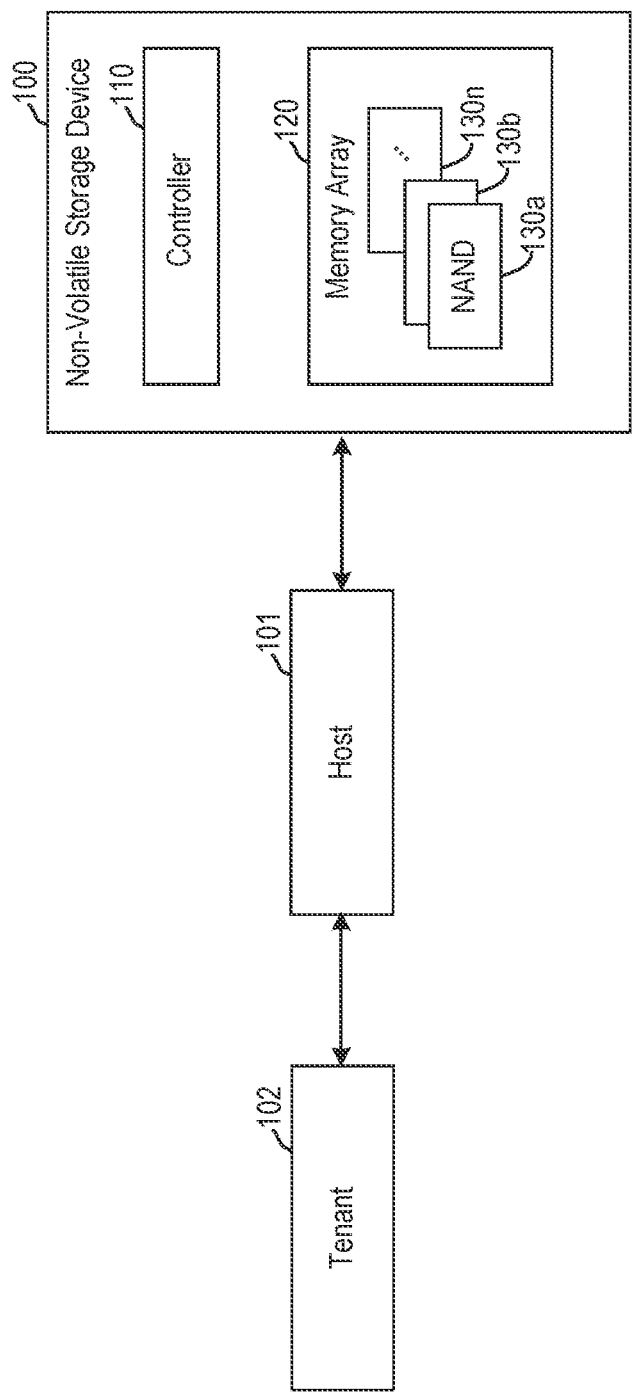
FIG. 1 shows a block diagram of a system including a non-volatile storage device, a host, and a tenant according to some implementations.

Thin provisioning a storage device (e.g., a non-volatile storage device such as an SSD) allows the storage device to report that the storage device can store an amount of data (e.g., a number of host logical addresses such as Logical Block Addresses (LBAs)) greater than the amount of data (e.g., the number of host logical addresses) that can be fully written to the storage device (e.g., the NAND storage device of the SSD). In some examples, a namespace is a set of logical block addresses (LBAs) corresponding to and used by the host application or software. The host can keep track of a number of logical blocks that a namespace currently has allocated by issuing a namespace utilization command or request (e.g., Namespace Utilization (NUSE)) to the storage device. In other words, namespace utilization allows the host to monitor the actual amount of data that is stored in the physical media (e.g., the NAND storage device).

Various tenant-based datacenter solutions (e.g., cloud storage) implement thin provisioning. In an example, a user subscribes to a certain amount of cloud storage (e.g., 200 GB of data for digital pictures) may only store about 50 GB. The datacenter supporting the cloud storage such that, instead of 150 GB of idle storage allocated for the user, the datacenter pools storage devices for multiple tenants and thin provision those storage devices together. In a sizable population of users, rarely would the datacenter fail to provide sufficient storage space for any user within the subscribed amount.

Attempts to implement and embedded hardware-accelerated compression engines for non-volatile memory storage devices (e.g., SSDs) have been largely unsuccessful due to host systems struggling to report a drive size against the storage available as a function of entropy of the data payload. For example, although human readable files compress nicely, encrypted data and pre-compressed data are difficult to compress. The host systems struggle with determining whether sufficient storage space is available for certain software applications.

Some arrangements relate to compressing host data when storing the host data to the storage devices, thus reducing the amount of host data actually stored on the storage devices. In prior compression approaches, the storage devices have not been configured to adequately report the extent of compression to allow the hosts to obtain accurate information on the available storage capacity. Compression has only been realized in the scenarios in which no additional host storage was possible, limiting compression benefits to improving write amplification and endurance.

Some arrangements relate to integrating host thin provisioning with hardware data compression, enhancing the degree to which thin provisioning will be effective. By allowing both compression and thin provisioning, the TCO for thin-provisioned storage device will be improved. This allows storage devices to be advertised as having a larger storage capacity given that data is compressed by the storage devices.

In some arrangements, a host monitors the space available (e.g., for a certain namespace, using NUSE), and the backend reports the actual available media storage as the frontend computes the NUSE. By incorporating a data compression unit, more backend clusters can be supported per unit of media.

To assist in illustrating the present implementations, FIG. 1 shows a block diagram of a system including a non-volatile storage device 100, a host 101, and a tenant 102 according to some implementations. In some examples, the host 101 can be a computing device, e.g., a device with processing capabilities, such as a desktop computer, a laptop computer, a server, a smart device, a touchpad, and so on. The host 101 may include an Operating System (OS), which is configured to provision a filesystem and applications which use the filesystem. In that regard, the tenant 102 is an example of an application or software that uses the filesystem. The tenant 102 may be located on the same computing device as the host 101 or on another computing device. The filesystem communicates with the non-volatile storage device 100 (e.g., a controller 110 of the non-volatile storage device 100) over a suitable wired or wireless communication link or network to manage storage of data in the non-volatile storage device 100. In that regard, the filesystem of the host 101 sends data to and receives data from the non-volatile storage device 100 using a suitable interface to the communication link or network.

In some examples, the non-volatile storage device 100 is located in a datacenter (not shown for brevity). The datacenter may include one or more platforms, each of which supports one or more storage devices (such as but not limited to, the non-volatile storage device 100). In some implementations, the storage devices within a platform are connected to a Top of Rack (TOR) switch and can communicate with each other via the TOR switch or another suitable intra-platform communication mechanism. In some implementations, at least one router may facilitate communications among the non-volatile storage devices in different platforms, racks, or cabinets via a suitable networking fabric.

Examples of the non-volatile storage device 100 include but are not limited to, a solid state drive (SSD), a non-volatile dual in-line memory module (NVDIMM), a Universal Flash Storage (UFS), a Secure Digital (SD) device, and so on. In other examples, the non-volatile storage device 100 can be operatively coupled to the host 101 in contexts other than datacenters.

The non-volatile storage device 100 includes at least a controller 110 and a memory array 120. Other components of the non-volatile storage device 100 are not shown for brevity. The memory array 120 (or non-volatile memory) includes NAND flash memory devices 130a-130n. Each of the NAND flash memory devices 130a-130n includes one or more individual NAND flash dies, which are Non-Volatile Memory (NVM) capable of retaining data without power. Thus, the NAND flash memory devices 130a-130n refer to multiple NAND flash memory devices or dies within the flash memory device 100. Each of the NAND flash memory devices 130a-130n includes one or more dies, each of which has one or more planes. Each plane has multiple blocks, and each block has multiple pages.

While the NAND flash memory devices 130a-130n are shown to be examples of the memory array 120, other examples of non-volatile memory technologies for implementing the memory array 120 include but are not limited to, (battery-backed) Dynamic Random Access Memory (DRAM), Magnetic Random Access Memory (MRAM), Phase Change Memory (PCM), Ferro-Electric RAM (Fe-RAM), and so on.

Examples of the controller 110 include but are not limited to, an SSD controller (e.g., a client SSD controller, a datacenter SSD controller, an enterprise SSD controller, and so on), a UFS controller, or an SD controller, and so on.

The controller 110 can combine raw data storage in the plurality of NAND flash memory devices 130a-130n such that those NAND flash memory devices 130a-130n function logically as a single unit of storage. The controller 110 can include processors, microcontrollers, buffers, error correction systems, data encryption systems, Flash Translation Layer (FTL) and flash interface modules. Such functions can be implemented in hardware, software, and firmware or any combination thereof. In some arrangements, the software/firmware of the controller 110 can be stored in the memory array 120 or in any other suitable computer readable storage medium.

The controller 110 includes suitable processing and memory capabilities for executing functions described herein, among other functions. As described, the controller 110 manages various features for the NAND flash memory devices 130a-130n including but not limited to, I/O handling, reading, writing/programming, erasing, monitoring, logging, error handling, garbage collection, wear leveling, logical to physical address mapping, data protection (encryption/decryption, Cyclic Redundancy Check (CRC)), Error Correction Coding (ECC), data scrambling, and the like. Thus, the controller 110 provides visibility to the NAND flash memory devices 130a-130n.

Figure 2:
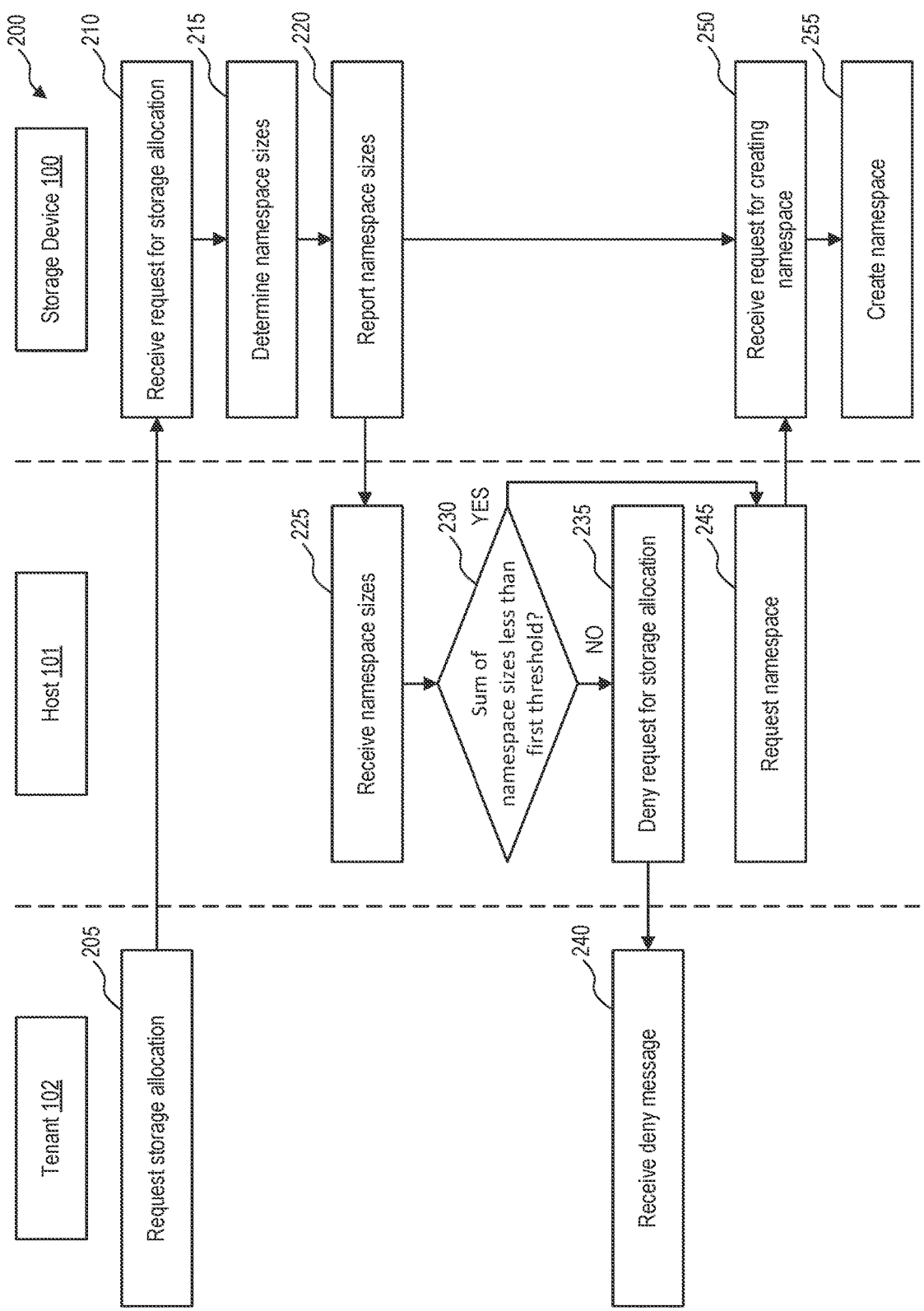
FIG. 2 is a flowchart diagram illustrating an example method for creating a namespace in the storage device, according to various arrangements.

FIG. 2 is a flowchart diagram illustrating an example method 200 for creating a namespace in the storage device 100 (FIG. 1), according to various arrangements. Referring to FIGS. 1-2, the method 200 can be performed by the storage device 100, the host 101, and the tenant 102. The storage device 100 and the host 101 determine whether a namespace can be created in response to a request for storage allocation by the tenant 102. In some examples, the method 200 reflects thin-provisioning of the memory array 120.

At 205, the tenant 205 requests storage allocation. For example, the tenant 205 can send a request message to the storage device 100 requesting allocation of storage space (e.g., requesting a namespace for storing data). In some examples, the tenant 205 sends the request message to the host 101, and the host 101 forwards the request message to the controller 110 of the storage device 100. In some examples, the tenant 205 requests the storage allocation for a given software or application corresponding to the tenant 205. At 210, the controller 110 of the storage device 100 receives the request for storage allocation.

In response to 210, the controller 110 determines namespace sizes, at 215. In some examples, the controller 110 stores information indicative of the namespace sizes in a memory internal to the controller 110, a memory external to the controller 110, and/or in the memory array 120. Each time a new namespace is created, the controller 110 updates the stored namespace size information by adding the new namespace and its allocated size. In response to receiving the request at 210, the controller 110 determines the namespace sizes by retrieving the stored namespace size information. At any given time, the actual data stored for the namespaces may be less than or substantially less than the allocated namespace sizes of the namespaces.

At 220, the controller 110 reports the namespace sizes to the host 101. For example, the controller 110 sends a namespace size report to the host 101. The namespace size report includes the allocated namespace size of each of one or more namespaces. At 225, the host 101 receives the namespace sizes.

At 230, the host 101 determines whether the sum of the namespace sizes is less than a first threshold. The first threshold designates a limit for thin-provisioning namespaces for the storage device 100. In some examples, the first threshold is determined based on a total capacity of the storage device 100 (e.g., the total capacity of the memory array 120) for storing data. In other words, the first threshold is determined based on a total capacity of a non-volatile memory used for storing host data. The total capacity of the storage device 100 includes at least valid data stored in the memory array 120, invalid data stored in the memory array 120 (ready for garbage collection), and empty space. In some arrangements, the first threshold is a multiple of the total capacity. For example, the first threshold is 1.5, 2, 2.5, 3, or 5 times the total capacity of the storage device 100.

In some examples, the multiple can be dynamically adjusted based on statistics gathered about the capacity characteristics of the tenant 102 and the compression factors. For example, a datacenter (e.g., a document server for users who store digital documents) typically has a plurality of tenants (each of which is a tenant such as but not limited to, the tenant 102) of a certain type/class (e.g., tenants that store digital documents). In some examples in which the data (e.g., digital document files) associated with the type of tenants is capable of being significantly compressed (high compressible factor), the multiple used to calculate the first threshold can be increased. On the other hand, in some examples in which the data (e.g., encrypted data) cannot be compressed or can be compressed only insignificantly (low compression factor), the multiple used to calculate the first threshold can be decreased. In some examples in which the capacity requested by the type of tenants is rarely used or the usage rarely exceeds a threshold (e.g., 10%, 20%, or 40% of the requested capacity) over a predetermined period of time, the multiple used to calculate the first threshold can be increased. On the other hand, in some examples in which the capacity requested by the type of tenants is typically used exceeding a threshold (e.g., 40%, 50% or 60% of the requested capacity) over the predetermined period of time, the multiple used to calculate the first threshold can be decreased. In other words, the multiple used to calculate the first threshold can be increased/decreased based on the type or class of tenants. In response to determining that the tenant 102 belongs to a first class, the multiple is increased (by an offset, by a percentage, or to a particular number). On the other hand, in response to determining that the tenant 102 belong to a second class, the multiple is decreased (by an offset, by a percentage, or to a particular number). In some arrangements, the multiple used to calculate the first threshold can be increased/decreased based on the compression factor. In response to determining that the compression factor associated with certain data or the tenant 102 is over a threshold, the multiple is increased (by an offset, by a percentage, or to a particular number). On the other hand, in response to determining that the compression factor associated with certain data or the tenant 102, the multiple is decreased (by an offset, by a percentage, or to a particular number).

In response to determining that the sum of the namespace sizes is not less than the first threshold (230:NO), the host 101 denies the request for the storage allocation at 235. For example, the host 1012 sends a deny message to the tenant 102. At 240, the tenant 102 receives the deny message indicating that the request for storage allocation has been denied.

On the other hand, in response to determining that the sum of the namespace sizes is less than the first threshold (230:YES), the host 101 requests a namespace at 245. For example, the host 101 sends a new namespace command to the storage device 100. At 250, the storage device 100 (e.g., the controller 110) receives the request for creating a namespace (e.g., the new namespace command). At 255, the storage device 100 (e.g., the controller 110) creates the new namespace.

In some arrangements, a higher level storage function in the host 101 responsible for the management of thin-provisioning operates in the background to prevent the deny message (e.g., at 235) from being received by the tenant 102 at 240, by provisioning further storage or moving namespaces from the storage device 100 to another storage device such as the storage device 100 to free up capacity.

Figure 3:
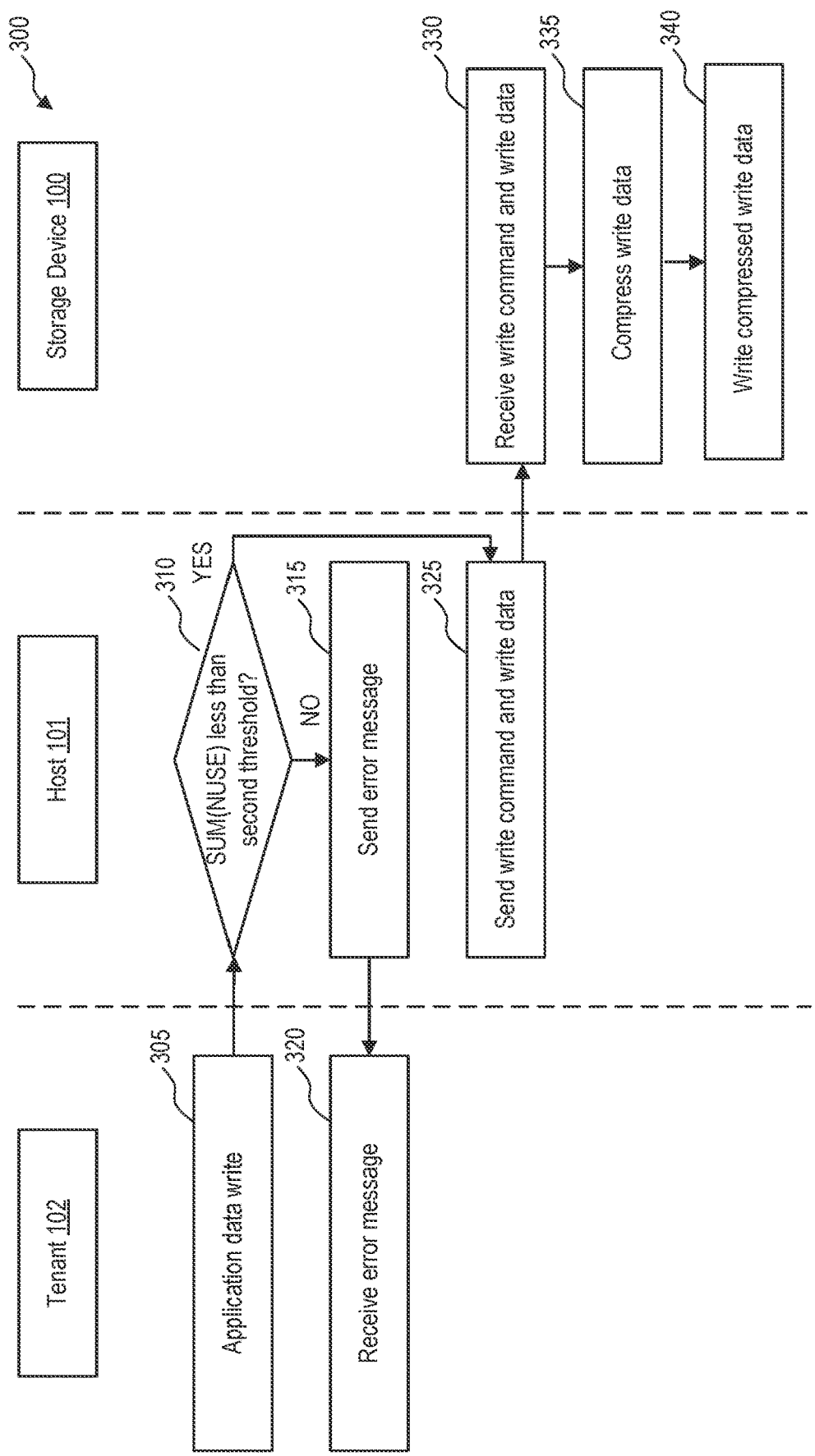
FIG. 3 is a flowchart diagram illustrating an example method for writing data to the storage device, according to various arrangements.

FIG. 3 is a flowchart diagram illustrating an example method 200 for writing data to the storage device 100 (FIG. 1), according to various arrangements. Referring to FIGS. 1-3, the method 300 can be performed by the storage device 100, the host 101, and the tenant 102. As shown, for any application data write operations, it is determined whether there is sufficient actual capacity to store the data. If there is no actual capacity, an error message is generated. On the other hand, if there is sufficient capacity, the data is compressed and written to the memory array 120.

At 305, the tenant 102 performs an application data write. For example, the tenant 102 sends a request for application data write and associated data (referred to herein as the "write data") to the host 101. At 310, the host 101 determines whether the sum of namespace utilization (e.g., SUM (NUSE)) is less than a second threshold. For example, the host 101 issues a namespace utilization command or request (e.g., NUSE) to the storage device 100 to retrieve a number of logical blocks that each namespace currently has allocated. The storage device 100 (e.g., the controller 110) stores information related to the number of logical blocks for each namespace has allocated in a memory internal to the controller 110, in a memory external to the controller 110, or in the memory array 120. In response to receiving the namespace utilization command or request, the controller 110 retrieves the information related to the number of logical blocks for each namespace has allocated and provides the same to the host 101.

The host 101 aggregates the sum of the namespace utilization (e.g., the sum of current namespace sizes of valid data of the namespaces of the storage device 100) and determines whether the sum is less than the second threshold. The second threshold designates a limit for physically writing the write data to the storage device 100 in view of thin-provisioning in the method 200. In some examples, the second threshold is determined based on the total capacity of the storage device 100 (e.g., the total capacity of the memory array 120) for storing data. In other words, the second threshold is determined based on the total capacity of the non-volatile memory used for storing host data. The total capacity of the storage device 100 includes at least valid data stored in the memory array 120, invalid data stored in the memory array 120 (ready for garbage collection), and empty space. In some arrangements, the second threshold is a fraction of the total capacity. For example, the second threshold is less than 100% (e.g., 95%, 90%, 80%, or so on) of the total capacity of the storage device 100.

In response to determining that the sum of namespace utilization of all namespaces is not less than the second threshold (310:NO), the host 101 sends an error message to the tenant 102 at 315. The tenant 102 receives the error message at 320.

On the other hand, in response to determining that the sum of namespace utilization is less than the second threshold (310:YES), the host 101 sends a write command and the associated write data to the storage device 100 to be written. The storage device 100 receives the write command and the write data at 330.

In response to receiving the write command and the write data, the storage device 100 (e.g., the controller 110) compresses the write data. The controller 110 can compress the write data using any suitable methods. The compressed write data has a size lesser than that of the uncompressed write data received from the host 101. At 340, the controller 110 writes the compressed write data to the memory array 120 (e.g., the non-volatile memory).

The method 300 is a compression the feedback loop between the host 101 and the storage device 100 that determines whether the tenant 102 is allowed to write more data to the namespace allocated in the method 200. The combination of compression with thin provisioning allows the storage device 100 to write more data, thus improving utilization and storage space efficiency.

In some arrangements, a higher level storage function in the host 101 responsible for the management of thin-provisioning operates in the background to prevent error message (e.g., at 315) from being received by the tenant 102 at 320, by provisioning further storage or moving namespaces from one the storage device 100 to another storage device such as the storage device 100 to free up capacity.

Figure 4:
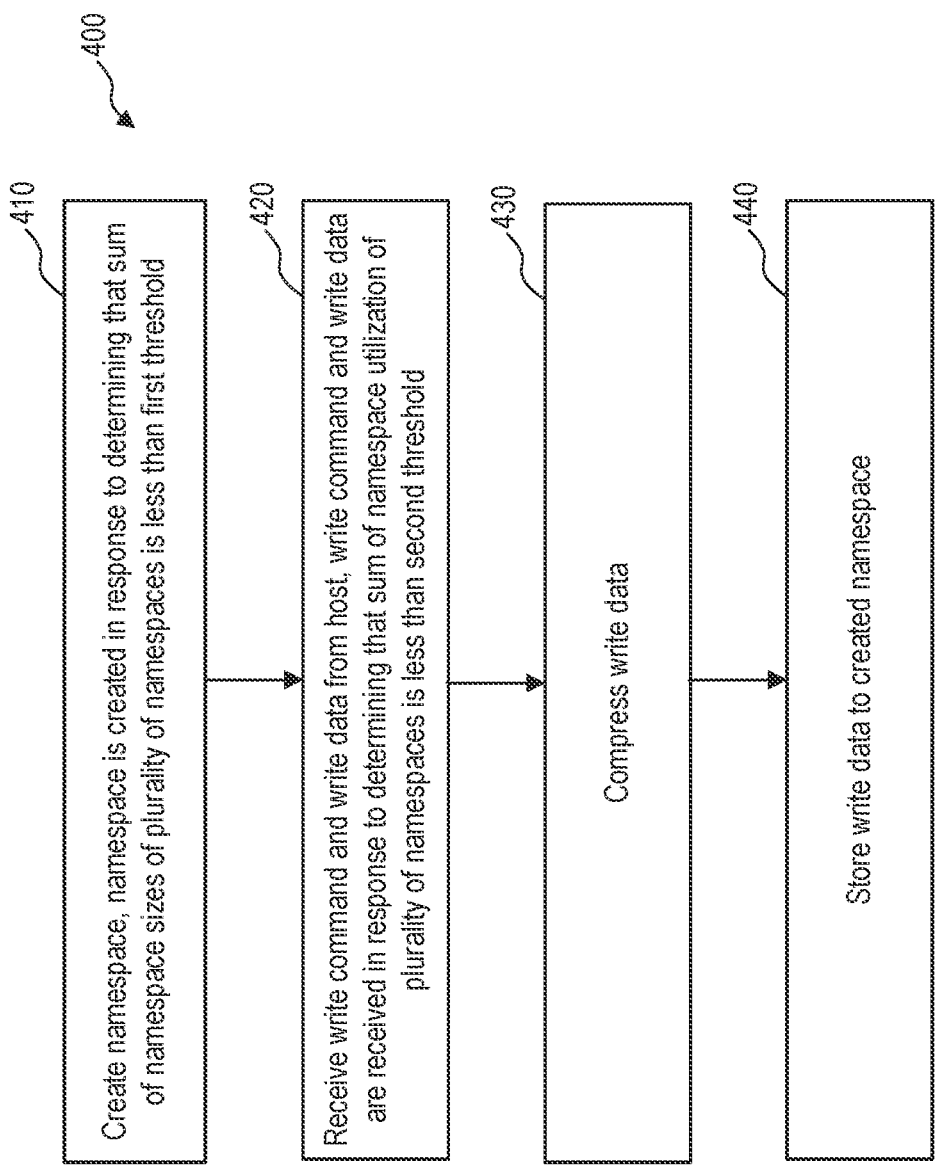
FIG. 4 is a flowchart illustrating an example method for creating and writing to a namespace, according to some arrangements.

FIG. 4 is a flowchart illustrating an example method 400 for creating and writing to a namespace, according to some arrangements.

At 410, a name space is created (e.g., at 255) in response to determining that a sum of namespace sizes of a plurality of namespaces is less than the first threshold (e.g., 230: YES).

At 420, the storage device 100 receives a write command and write data from the host 101 (e.g., at 330). The write command and the write data are received in response to determining that a sum of namespace utilization of the plurality of namespaces is less than the second threshold (e.g., 310:YES).

At 430, the storage device 100 (e.g., the controller 110) compresses the write data (e.g., at 335). At 440, the storage device 100 (e.g., the controller 110) stores the write data to the created namespace, in the memory array 120 (the non-volatile storage), e.g., at 340.

In some arrangements, the method 400 further includes receiving a request for storage allocation (e.g., at 210). In response to receiving the request for storage allocation, the storage device 100 (e.g., the controller 110) reports the namespace sizes of the plurality of namespaces to the host (e.g., at 220).

In some arrangements, the method 400 further includes receiving from the host 101 a request for creating a new namespace (e.g., at 250). In response to receiving the request for creating the new namespace, the storage device 100 (e.g., the controller 110) creates the namespace (e.g., at 255).

In the example in which the sum of the namespace sizes of the plurality of namespaces is not less than the first threshold (230:NO), the request for storage allocation is denied (e.g., at 235 and 240).

In some arrangements, the first threshold is determined based on a total capacity of the non-volatile memory (e.g., the memory array 120) used for storing host data or tenant data. Data corresponding to the plurality of namespaces is stored in the non-volatile memory. For example, the first threshold is a multiple of the total capacity of the non-volatile memory.

In some arrangements, the second threshold is determined based on the total capacity of the non-volatile memory. Data corresponding to the plurality of namespaces is stored in the non-volatile memory. For example, the second threshold is less than the total capacity of the non-volatile memory.

In the example in which the sum of the namespace utilization of the plurality of namespaces is not less than the second threshold (e.g., 310:NO), the application data write operation for the data is denied (e.g., at 315 and 320).

The namespace utilization of the plurality of namespaces includes sizes of valid data corresponding to the plurality of namespaces that is stored in the memory array 120 (e.g., the non-volatile memory) of the storage device 100.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method, comprising:
   creating, by a storage device, a namespace, wherein the namespace is created in response to determining that a sum of namespace sizes of a plurality of namespaces is less than a first threshold;
   receiving, by the storage device, a write command and write data from a host, wherein the write command and the write data are received in response to determining that a sum of namespace utilization of the plurality of namespaces is less than a second threshold;
   compressing, by a storage device, the write data; and
   storing, by the storage device, the compressed write data to the created namespace.

2. The method of claim 1, further comprising:
   receiving a request for storage allocation; and
   in response to receiving the request for storage allocation, reporting the namespace sizes of the plurality of namespaces to the host.

3. The method of claim 2, wherein
   a sum of the namespace sizes of the plurality of namespaces is not less than the first threshold; and
   the request for storage allocation is denied.

4. The method of claim 1, further comprising:
   receiving from the host a request for creating a new namespace; and
   in response to receiving the request for creating the new namespace, creating the namespace.

5. The method of claim 1, wherein
   the first threshold is determined based on a total capacity of a non-volatile memory; and
   data corresponding to the plurality of namespaces is stored in the non-volatile memory.

6. The method of claim 1, wherein the first threshold is a multiple of the total capacity of the non-volatile memory, the multiple being dynamically adjusted.

7. The method of claim 1, wherein
   the second threshold is determined based on a total capacity of a non-volatile memory; and
   data corresponding to the plurality of namespaces is stored in the non-volatile memory.

8. The method of claim 1, wherein the second threshold is less than a total capacity of the non-volatile memory.

9. The method of claim 1, wherein
   a sum of the namespace utilization of the plurality of namespaces is not less than the second threshold; and
   an application data write operation for the write data is denied.

10. The method of claim 1, wherein the namespace utilization of the plurality of namespaces comprises sizes of valid date corresponding to the plurality of namespaces that is stored in a non-volatile memory of the storage device.

11. Non-transitory processor-readable media comprising processor-readable instructions such that, when executed by one or more processors, causes the processors to:
   create a namespace, wherein the namespace is created in response to determining that a sum of namespace sizes of a plurality of namespaces is less than a first threshold;
   receive a write command and write data from a host, wherein the write command and the write data are received in response to determining that a sum of namespace utilization of the plurality of namespaces is less than a second threshold;

compress the write data; and store the compressed write data to the created namespace.

12. The non-transitory computer-readable media of claim 11, wherein the processors are further caused to:

receive a request for storage allocation; and in response to receiving the request for storage allocation, report the namespace sizes of the plurality of namespaces to the host.

13. The non-transitory computer-readable media of claim 12, wherein a sum of the namespace sizes of the plurality of namespaces is not less than the first threshold; and the request for storage allocation is denied.

14. The non-transitory computer-readable media of claim 11, wherein the processors are further caused to:

receive from the host a request for creating a new namespace; and in response to receiving the request for creating the new namespace, create the namespace.

15. The non-transitory computer-readable media of claim 11, wherein the first threshold is determined based on a total capacity of a non-volatile memory; and data corresponding to the plurality of namespaces is stored in the non-volatile memory.

16. The non-transitory computer-readable media of claim 11, wherein the first threshold is a multiple of the total capacity of the non-volatile memory, the multiple being dynamically adjusted.

17. The non-transitory computer-readable media of claim 11, wherein the second threshold is determined based on a total capacity of a non-volatile memory; and data corresponding to the plurality of namespaces is stored in the non-volatile memory.

18. The non-transitory computer-readable media of claim 11, wherein the second threshold is less than the total capacity of the non-volatile memory.

19. The non-transitory computer-readable media of claim 11, wherein a sum of the namespace utilization of the plurality of namespaces is not less than the second threshold; and an application data write operation for the write data is denied.

20. A storage device, comprising:

a non-volatile memory; and a controller configured to:

create a namespace, wherein the namespace is created in response to determining that a sum of namespace sizes of a plurality of namespaces is less than a first threshold;

receive a write command and write data from a host, wherein the write command and the write data are received in response to determining that a sum of namespace utilization of the plurality of namespaces is less than a second threshold;

compress the write data; and store the compressed write data to the created namespace.

* * * * *